United States Patent Office 2,728,714
Patented Dec. 27, 1955

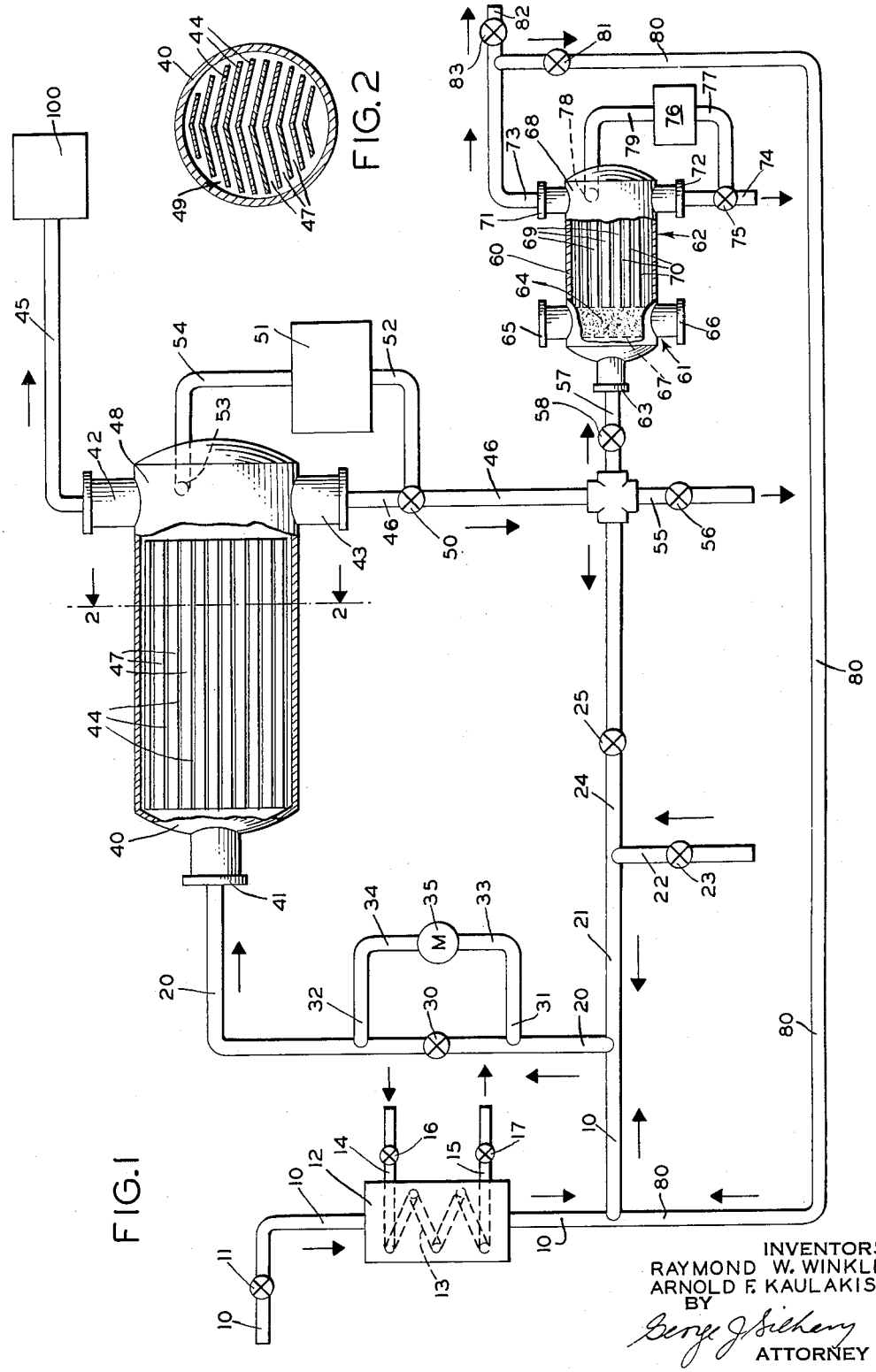
Dec. 27, 1955  R. W. WINKLER ET AL  2,728,714
DEASHING HYDROCARBON OILS BY WATER WASHING
Filed May 20, 1954
INVENTORS
RAYMOND W. WINKLER
ARNOLD F. KAULAKIS
BY
ATTORNEY

2,728,714

DEASHING HYDROCARBON OILS BY WATER WASHING

Raymond W. Winkler, Linden, and Arnold F. Kaulakis, Chatham, N. J., assignors to Esso Research and Engineering Company, a corporation of Delaware Application May 20, 1954, Serial No. 431,228

7 Claims. (Cl. 196—52)

This invention relates to the purification of hydrocarbon oils. More particularly this invention relates to a novel method for removing metal contaminants from hydrocarbon oils and more specifically from those oils which are used as feed stocks to catalytic conversion processes by washing the hydrocarbon oils with water. Still more particularly this invention relates to a method for removing essentially water-insoluble metal compounds from hydrocarbon gas oils which are used as feed stocks to catalytic cracking processes.

Catalytic cracking is utilized extensively at the present time to convert hydrocarbon gas oils to more valuable lower boiling products. These hydrocarbon gas oils, which have a boiling range of about 400–1100° F., when contacted with a catalytic substance under appropriate conditions of pressure and temperature produce a large percentage of hydrocarbons boiling within the motor gasoline boiling range. A wide variety of catalysts have been employed in this type of process including both natural substances such as acid activated clay and synthetic substances such as silica-alumina, silica-magnesia, etc. At the present time, there are three different major types of catalytic cracking processes employed in the petroleum industry. These are the fixed bed process, the moving bed process and the fluid process. The names of the particular processes refer in general to the manner in which the catalyst is utilized to contact the hydrocarbon gas oils. Thus in the fixed bed process, the catalytic substance is maintained as a fixed or stationary bed through which the hydrocarbon gas oil is passed in the vaporous form at an elevated temperature. In this process, after a certain time the catalyst becomes fouled with carbonaceous deposits so that it is necessary to discontinue the flow of the hydrocarbon oil therethrough and to regenerate the catalyst by burning off the carbonaceous deposits by means of air passed through the stationary bed of catalyst.

In the moving bed process, the catalyst which is in the form of pellets or beads is continuously recycled between a separate conversion zone and a separate regeneration zone. Thus, in the moving bed process, a hydrocarbon gas oil in the vaporous form is continuously passed through the reaction zone at an elevated temperature wherein it is converted to lower boiling products and wherein a certain amount of carbonaceous deposits are laid down on the catalyst. The carbonaceous-fouled catalyst, or spent catalyst as it is usually termed, is then passed to the regeneration zone wherein the carbonaceous deposits are burned off with air to thereby regenerate the catalyst, and the regenerated catalyst is then passed back to the reaction zone for further contact with more hydrocarbon gas oil.

In the fluid process, a finely divided catalyst, substantially all of which has a size range of about 0–100 microns, is continuously recycled between a separate reaction zone and a separate regeneration zone. This finely divided catalyst when aerated acts very much like a liquid so that it is readily circulated throughout the system. This catalyst which is normally maintained in the reaction zone as a dense fluid bed is contacted therein with hydrocarbon vapors and the resultant spent catalyst is passed to a regeneration zone. The catalyst as in the reaction zone is normally maintained in the regeneration zone as a dense fluid bed. Air is passed through the bed to burn off the carbon on the catalyst. Thereafter the regenerated catalyst is passed back to the reaction zone for further contact with additional gas oil. Although both the moving bed and fluid processes are of a truly continuous nature, the fluid process provides certain advantages over the moving bed as well as the fixed bed process, such as better utilization of the heat in the system, better control of process variables, etc. In any event, however, the utilization of these catalytic cracking processes in the petroleum industry has resulted in a substantial increase in the amount of high octane gasoline produced from crude oil. In addition, the cracking processes have made available a large amount of olefins and diolefins which may be utilized as raw materials in such other hydrocarbon processes as rubber synthesis, alkylation, polymerization, etc.

In any catalytic cracking process, the catalyst employed is in a large part responsible for the effectiveness of the process. In general the efficiency of the catalyst, as well as the process itself, is measured by the relative percentages of gasoline, coke and dry gas ($C_3$ and lighter) produced. More specifically the efficiency of the catalyst is measured by its ability to maximize the percentage of high octane gasoline and by its ability to minimize the percentage of dry gas and carbon formed in the catalytic cracking process. Recently it has been found that certain substances which are contained in the hydrocarbon gas oil fed to the catalytic cracking process have an exceedingly detrimental effect on the efficiency or selectivity of the catalyst. More particularly, it has been found that metallic compounds and complexes such as those of iron, nickel, vanadium, sodium, copper, magnesium, calcium, etc. substantially decrease the selectivity of especially synthetic catalysts so that the yield of high octane gasoline is reduced and the yields of coke and dry gas are increased. Although these contaminants are present in the amount of only a few pounds or less per thousand barrels of gas oil, they have a substantial effect on the selectivity of the catalyst. The presence of these contaminants may be accounted for in several ways. They may for example have been originally contained in the crude oil introduced to the crude distillation units and as a result were passed into the gas oil fractions in the distillation process either by entrainment or by vaporization in the case of the more volatile metallic compounds. Also certain amounts of these contaminants may be introduced into the gas oil from corroded metal lines and storage tanks during the various processing operations.

Because of the chemical and physical nature of many of these metal contaminants, they are not readily removable from the hydrocarbon gas oil. Although it is well known to water wash hydrocarbon fractions to thereby remove water-soluble metal compounds such as sodium chloride, these prior techniques are ineffective in removing any substantial amount of the essentially water-insoluble and partially oil-soluble metallo-organic compounds and complexes such as those of iron, nickel, vanadium, sodium, copper, magnesium, calcium, etc. This is because the characteristics of water-soluble and essentially water-insoluble contaminants are substantially different. Thus, more specifically, conventional desalting of hydrocarbon fractions involves the principle that salts such as sodium chloride are substantially more soluble in water than in oil. However, unfortunately, the metallo-organic compounds and complexes are essentially insoluble in water and are in fact considerably more selectively found in the oil than in the water. Actually it is believed from experimental studies that the metallo-organic contaminants tend to accumulate at a water-oil interface in preference to being in either the water or oil itself. Apparently the organic portion of these compounds is oriented in the oil portion of the interface and the inorganic portion of these compounds is oriented in the water portion of the interface.

Because the need for removing these essentially water-insoluble contaminants has been recognized previously, a number of prior art methods have been developed in an attempt to solve this problem. Such methods are commonly known as deashing. In one method, a certain amount of these water-insoluble metal contaminants are removed by filtering them from the hydrocarbon gas oil. A variety of filtering media have been employed, including paper, sand and porous metals. However, filtering has the disadvantage that it requires regeneration or replacement of the filtering media from time to time, which of course precludes a truly continuous operation as well as introduces a costly step into the treatment of the hydrocarbon oil. In addition, because many of the contaminant particles may have a size smaller than 1/10 of a micron in average diameter, a very fine filtering media is required and as a result rapid plugging of the filters is encountered. Also a large amount of these fine particles which effectively act as a colloidal suspension readily pass through the filtering medium. Of course filtration is relatively ineffective in removing the relatively oil-soluble metallo-organic compounds.

In another method, the hydrocarbon oil is vigorously mixed with a small amount of water which amount normally is less than 10% by volume of the oil and the two are emulsified together, after which the emulsion is settled for about 1–4 days to form a major oil portion and a minor relatively stable emulsion portion. In this method, the metal contaminants are concentrated at the oil-water interface which exists predominantly in the emulsion portion. This emulsion portion is removed and broken by conventional emulsion breaking means to separate out a water layer and an oil layer. The concentrated water layer which contains metallic contaminants is discarded from the system. This particular method however has the disadvantage of requiring a considerable length of time to effect the desired purification because of the nature of the emulsion formed in the process.

Heretofore, no simple and rapid method has been developed for effectively removing the essentially water-insoluble metallic contaminants from hydrocarbon gas oils. The present invention is designed to overcome the disadvantages of the prior art methods which generally require costly and complex installations. Briefly, the method of the present invention involves introducing a hydrocarbon gas oil and water into a mixing zone in the proportions of about 1–2 parts of oil per part of water by volume at a mixing intensity equivalent to a differential pressure of about 6–10 p. s. i., settling the mixture to form an upper oil layer containing less than about 0.3% by volume of residual water and a lower water layer containing not less than about 3% by volume of residual oil and separately withdrawing the settled oil and water layers. In a specific embodiment of the invention a portion of the settled water may be recycled back to the mixing zone and the remainder of the settled water may be passed to a separation zone wherein the residual oil is separated from the water. The separated residual hydrocarbon oil in this embodiment is then recycled back to the mixing zone and the separated water from the separation zone is discarded. It has been found that the method of this invention is exceedingly effective in removing essentially water-insoluble metallic contaminants from hydrocarbon oils.

It is an object of this invention to provide a simple, rapid and effective method for removing essentially water-insoluble contaminants from hydrocarbon gas oils.

It is a further object of this invention to provide a method for improving the quality of hydrocarbon gas oils which are used as feed stocks to catalytic cracking processes.

It is a further object of this invention to provide a method for preventing the contamination of catalysts which are used to convert hydrocarbon gas oils.

Other objects of this invention will be apparent from a reading of this specification, which will best be understood when read in conjunction with the drawings in which:

Fig. 1 is a diagrammatic showing of apparatus adapted to carry out the method of the present invention, and Fig. 2 is an enlarged transverse cross-sectional view of the settling apparatus of the present invention taken along the line 2—2 of Fig. 1, looking in the direction of the arrows.

Referring now to the drawing, reference character 10 designates a conduit for introducing a hydrocarbon gas oil to the system of the present invention. This hydrocarbon gas oil will normally be obtained from crude distillation units such as pipe stills wherein a crude oil is split into a number of fractions, one of which is the hydrocarbon gas oil herein referred to which will have a boiling range normally between about 400° and 1100° F. This hydrocarbon gas oil will ordinarily contain water-insoluble metallic compounds as well as a small amount of water-soluble metallic compounds. However, in certain instances such as when the crude oil has been desalted prior to crude distillation, essentially no water-soluble metallic compounds will be present in the hydrocarbon gas oil. In the invention, as shown in the drawing, a substantial portion of the essentially water-insoluble metallic compounds will be removed from this hydrocarbon gas oil so that it may be sent directly from the de-ashing apparatus shown in the drawing to a catalytic cracking system 100. However, in addition to the essentially water-insoluble metallic compounds which are removed, it is to be clearly understood that substantially all of any water-soluble metal compounds will also be removed from the hydrocarbon gas oil in the method of this invention.

In any event, the hydrocarbon gas oil containing essentially water-insoluble metal compounds is passed through conduit 10 at a rate controlled by valve 11 in conduit 10. Heat exchanger 12 is interposed in conduit 10 to heat the hydrocarbon gas oil to a temperature of preferably about 170 to 250° F. This temperature range is optimum for the subsequent settling operation, which will hereinafter be described in detail, because a high settling rate will be obtained without excessive foaming. Thus, when the hydrocarbon gas oil is fed to the system of the present invention from storage tanks for example, a heating medium such as steam may be passed through coil 13 of heat exchanger 12 to heat the hydrocarbon gas oil to the aforementioned temperature. This heating medium is introduced to coil 13 by means of inlet line 14 containing valve 16 and removed from coil 13 by means of outlet line 15 containing valve 17. Valves 16 and 17 are employed to regulate the amount of heating effected in heat exchanger 12. If the hydrocarbon gas oil on the other hand is passed directly into conduit 10 from the crude distillation unit at a temperature in the range of 170–220°, it is of course unnecessary to effect any heating of the gas oil in heat exchanger 12 in which case valve 16 in inlet line 14 would be closed.

The heated hydrocarbon gas oil is introduced through conduit 10 into conduit 20 wherein it is combined with water introduced from conduit 21. The hydrocarbon gas oil and water are combined in the proportions of about 1–2 parts of oil per part of water by volume, or expressed in another way, the total oil-water mixture passing through conduit 20 contains about 33–50% water by volume. Interposed in conduit 20 is a mixing device which, as shown in this specific embodiment of the present invention, comprises a globe valve 30, but it is to be clearly understood that any equivalent mixing means, such as a series of orifices or a tank equipped with a mechanical stirrer for example, could be substituted for globe valve 30. However, it is essential to the present invention that the intensity of mixing be equivalent in any case to about a 6–10 p. s. i. pressure drop. Thus, the hydrocarbon gas oil and water in passing through globe valve mixer 30 are vigorously and intimately mixed together therein with a resultant pressure drop occurring across globe valve 30. A mixing intensity of less than about 6 p. s. i. will not provide sufficient mixing of the oil and water, whereas on the other hand, a mixing intensity of more than about 10 p. s. i., will result in the formation of relatively stable oil-water emulsions which will not readily separate upon settling. Meter 35 is employed in this invention to indicate the pressure drop across valve 30 by measuring the difference in pressure between points 31 and 32 in conduit 20 which are immediately before and after globe valve 30. To accomplish this, lead lines 33 and 34 of meter 35 are connected at points 31 and 32, respectively, in conduit 20. Thus, by reading meter 35, it is then possible to regulate valve 30 so that a pressure drop in the range of 6–10 p. s. i. is maintained at all times across valve 30. If desired, meter 35 may be adapted to automatically control the setting of mixer 30 to maintain the mixing intensity in the range of 6–10 p. s. i.

The hydrocarbon gas oil-water mixture passing through conduit 20 is introduced into settler 40 through inlet port 41. Settler 40 is preferably a cylindrically shaped tank having its longitudinal axis arranged in a horizontal position and is preferably provided in its interior with a multiplicity of spaced generally horizontally arranged baffles 44. The purpose of baffles 44 is to faciilitate the separation by gravity of the hydrocarbon gas oil and the water by in effect providing a multiplicity of shallow settling zones. In this way, the vertical distance involved in disengaging droplets of water and oil from the oil-water mixture is substantially reduced. Thus, the oil-water mixture is introduced through inlet port 41 which is located centrally at one end of settler 40 and this mixture is then passed from left to right in the drawing, flowing horizontally through a multiplicity of passageways 47 formed by baffles 44. In passing through passageways 47, the oil droplets which are separated from the mixture rise to the top of each passageway under the bottom surface of the baffle defining the upper level of the particular passageway. On the other hand, the water droplets which are separated from the mixture fall to the bottom of each passageway and upon the upper surface of the baffle defining the lower level of the particular passageway.

Referring now to Fig. 2, it will be noted that each of baffles 44 is formed in a somewhat inverted V-shape and that the sides of each baffle are spaced from the cylindrical wall of settler 40. The width of each of baffles 44 is dependent upon its position in settler 40 so that all of the baffles are substantially equidistantly spaced from the cylindrical wall of settler 40. Thus, the width of the upper and lower baffles is necessarily less than the more centrally located baffles. The oil settling out of the oil-water mixture thus tends to accumulate in the upper central portion of passageways 47 and the water settling out tends to flow downward over the top of baffles 44 into outer annular zone 49 formed along the wall of settler 40 between the cylindrical wall and the sides of baffles 44.

Thus, by the time the hydrocarbon gas oil-water mixture has flowed completely through passageways 47, and into terminal section 48 of settler 40, it has been generally separated into a multiplicity of relatively well-defined centrally located upper oil layers and a somewhat annularly arranged outer water layer. The oil in section 48 accumulates therein as an upper oil layer containing a certain amount of residual water and the water accumulates therein as a lower water layer containing a certain amount of residual oil. The separated oil is removed from settler 40 through upper outlet port 42, and passes therefrom into conduit 45. It is important that a settler of sufficient capacity be employed so that the hydrocarbon gas oil passing from settler 40 through conduit 45 contains less than about 0.3% residual water which is generally in the form of suspended droplets. More specifically for a mixing intensity equivalent to about 6–10 p. s. i., the settler should provide a settling surface of sufficient area such that the oil-water mixture throughput will not exceed about 0.5 G. P. M. (gallons per minute)/ft.$^2$ of settler surface area. The settler surface area in this specific embodiment of the present invention is equivalent to the summation of the horizontal areas provided by baffles 44. It is to be understood that other forms of settlers may be employed in this invention so long as they provide a settling area compatible with a throughput of not more than 0.5 G. P. M./ft.$^2$.

The hydrocarbon gas oil in conduit 45 may be passed directly to catalytic cracking system 100, or, if desired, may be passed to tankage (not shown) prior to its passage to catalytic cracking system 100. In accordance with the present invention, about 40–70% or more of the water-insoluble metal compounds are removed from the hydrocarbon gas oil which was originally introduced to the system through conduit 10. Thus, it will be seen that in the method of this invention the hydrocarbon gas oil passed through conduit 45 to catalytic cracking system 100 is substantially improved due to the removal of a substantial portion of the compounds of such metals as iron, nickel, vanadium, sodium, copper, magnesium, calcium, etc. which if not removed would substantially decrease the selectivity of the catalyst employed in catalytic cracking system 100 to convert the hydrocarbon gas oil.

The water settling out in terminal portion 48 of settler 40 is withdrawn from the bottom thereof through bottom outlet port 43 and is passed therefrom into conduit 46. The rate of removal of water from settler 40 through conduit 46 is regulated by valve 50 arranged in conduit 46. In order to regulate the setting of valve 50, level recording device 51 may be employed. Float 53 which is adapted to float on water and sink in oil is disposed in terminal portion 48 of settler 40 to thereby detect the bottom of the oil layer at the water-oil interface therein. If float 53 moves any substantial distance up or down from a predetermined elevation in settler 40 which is preferably approximately intermediate the upper and lower ends of settler 40, this movement is detected electrically or pneumatically by level controller 51 through connection 54. Level controller 51 then simultaneously adjusts valve 50 through electrical or pneumatic connecting means 52 to thereby adjust the level of the water-oil interface so as to return float 53 to its predetermined position. On account of the mixing and settling conditions employed in this invention, the settled water passing from settler 40 through conduit 46 contains about 3–8% of residual oil which is generally in the form of suspended droplets and a substantial portion of the metal compounds originally contained in the hydrocarbon gas oil introduced into the system through conduit 10. Also for these conditions the purified settled oil contains less than about 0.3% of residual water. To accomplish these results, the settler throughput is maintained in the range of 0.05–0.5 G. P. M./ft.$^2$.

This oil-containing water in conduit 46 is preferably discarded from the system by passing it from conduit 46 through conduit 55 by opening valve 56 in conduit 55. However, in a specific embodiment of the invention it is possible to recycle a portion, which may be as much as about 90%, of this water back to the system for combination with additional hydrocarbon gas oil so as to substantially reduce the water requirements of the present invention as well as to prevent the discard of the valuable oil contained in the water. Thus, it is possible to pass a portion of the water from conduit 46 through conduit 24 and from thence through conduit 21 into conduit 20. This is accomplished by adjusting valve 25 in conduit 24. The remainder of the water passing through conduit 46 may then be discarded from the system through conduit 55 if desired by adjusting valve 56 to accomplish this to thus purge the system of the undesirable metal compounds. In this case an amount of fresh water equal to the amount of water discarded through conduit 55 is introduced into conduit 21 through conduit 22.

However, in another specific embodiment of this invention, no water is discarded from the system through conduit 55, and the aforementioned remainder of the water is passed through conduit 57 to coalescer-settler 60 by adjusting valve 58 in conduit 57 to accomplish this. In this case, in order to replace the water passed through conduit 57, an equivalent amount of fresh water is introduced into conduit 21 through conduit 22 by adjusting valve 23 in conduit 22. Thus, the hydrocarbon gas oil passing from conduit 10 into conduit 20 will be combined therein with a mixture of water comprising a portion of recycle water and a portion of fresh water. In the case where no water is recycled back to the mixer 30, it is possible to pass all of this water through coalescer-settler 60 and to utilize only fresh water for admixture with the gas oil fed to mixer 30.

The water introduced into coalescer-settler 60 through conduit 57, as previously mentioned, contains a small amount of residual oil, namely about 3-8% of residual oil. This oil-containing water is introduced through inlet port 63 into coalescer-settler 60 wherein it is initially passed through coalescer section 61 and then subsequently passed through settling section 62. Coalescer section 61 is employed in this invention to break down any oil-water emulsion which may exist in the water. Coalescer 61 comprises a vertically disposed bed 64 of sand, or other coalescing medium which is arranged transversely within and at the inlet end of the horizontally arranged cylindrically-shaped coalescer-settler 60. Sand bed 64 is maintained within coalescer-settler 60 by means of perforated housing 67 which may comprise a fine wire screen, for example, to permit passage of the oil-containing water through sand bed 64. If the sand bed 64 becomes fouled with deposits such that it does not perform properly, it may be withdrawn through port 66 and new sand may be introduced through upper port 65 when coalescer-settler 60 is not in operation. During the operation of coalescer-settler 60, ports 65 and 66 are closed to prevent the flow of liquid therethrough.

Thus, the water, after flowing from left to right in the drawing through coalescer section 61, then enters settling section 62. Settling section 62 is similar in design to settler 40, previously described, except that settling section 62 is of a lesser capacity than settler 40 because of the lower volume throughput involved. The oil-containing water is thus passed from left to right in the drawing through horizontal passageways 69 which are defined by a plurality of spaced horizontally-arranged baffles 70 which are similar to baffles 44 of settler 40. The separated oil and water form an upper oil layer and lower water layer in terminal section 68 of settling section 62 and the oil is removed from upper outlet port 71 and passed into conduit 73 and the water is removed through lower outlet port 72 and passed into conduit 74. The water passed through conduit 74 is discarded from the system of the present invention in order to thereby purge the system of the water-insoluble metal compounds as well as of the water-soluble metal compounds. The rate of removal of this water purge is controlled by level controller 76 which is actuated by float 78 disposed in terminal section 68 of settling section 62. The change of level of float 78 in section 68 actuates level controller 76 through electrical or pneumatic connection 79 which in turn regulates valve 75 through electrical or pneumatic connection 77.

The oil passing through conduit 73 may be removed from the system by passing it through conduit 82 by opening valve 83 therein. However, the oil passing through conduit 73 may also be passed through conduit 80 by opening valve 81 therein and closing valve 83 so that this oil is recycled back to conduit 10 for admixture with the fresh hydrocarbon oil being introduced to the system of the present invention. In doing this, substantially all of the oil passed to the system through conduit 10 will eventually be passed through conduit 45 to catalytic cracking system 100 which may be either a fixed bed, moving bed or fluid bed type of cracking system. It is to be understood that suitable pumping apparatus may be installed at appropriate locations in the system of the present invention to provide the flow necessary to carry out the method of the present invention. It will also be understood that other modifications of the present process may be made by those skilled in the art without departing from the spirit of the present invention. The method of this invention is applicable to hydrocarbon oils in general such as gas oils, naphthas, residua, crude oils, etc.

The following example is intended to illustrate the method of the present invention more specifically but it is to be clearly understood that the present invention is not to be limited to the specific values hereinafter given. In this example the removal of water-insoluble metal compounds will be exemplified by iron compounds since accurate analyses are available at this time for this particular metal. About 40,000 barrels per day of a heavy hydrocarbon gas oil having a boiling range of about 500 to 1100° F. and an A. P. I. gravity of about 26° are passed through conduit 10 and heat exchanger 12 wherein the gas oil is heated to about 200° F. This hydrocarbon gas oil which is a typical refinery gas oil feed stock for catalytic cracking contains about 0.28 pound of iron compounds expressed as $Fe_2O_3$ per thousand barrels of gas oil, a substantial portion of which it is desired to remove prior to the passage of the gas oil to catalytic cracking system 100. These 40,000 barrels per day of hydrocarbon gas oil are passed from conduit 10 into conduit 20 wherein they are combined with about 25,100 barrels per day of water. The water and hydrocarbon gas oil are then passed through globe valve 30 wherein the intensity of mixing is equivalent to a pressure drop of about 10 p. s. i. and the resultant oil-water mixture is thereafter passed into settler 40.

In this specific example, settler 40 is a cylindrical vessel which is arranged with its axis in a horizontal direction and which has dimensions of 13' in diameter and 40' in length. Settler 40 contains 25 baffles which are vertically spaced 6" apart and which slope from their center downwards at an angle of 5° from the horizontal. The effective settling surface area of the baffled settler 40 is thus about 10,000 ft.² so that the throughout velocity is about 0.2 G. P. M./ft.². About 38,300 barrels per day of oil are settled out in settler 40 and are removed therefrom through outlet port 42 and passed through conduit 45 to catalytic cracking system 100. This purified hydrocarbon gas oil contains about 0.2% residual water and contains about 0.12 pound of iron compounds expressed as $Fe_2O_3$ per thousand barrels of gas oil. Thus, about 56% of the iron contaminants which were originally contained in the hydrocarbon gas oil are removed by the method of the present invention. About 24,300 barrels per day of water are removed from settler 40 through outlet port 43 and are passed into conduit 46 and discarded from the system through conduit 55. This settled water contains about 6% by volume of residual oil. Although this example has been specifically drawn to the compounds of iron, it is to be understood that other water-insoluble metal compounds such as those of nickel, vanadium, copper, sodium, magnesium, calcium, etc. as well as the water-soluble metal compounds of these metals will likewise be removed.

What is claimed is:

1. A method for removing essentially water-insoluble contaminants from a hydrocarbon oil which comprises combining a hydrocarbon oil with water in the proportions of about 1–2 parts of hydrocarbon oil per part of water by volume, introducing the combined hydrocarbon oil and water into a mixing zone wherein the hydrocarbon oil and water are intimately mixed at a mixing intensity equivalent to a differential pressure of about 6–10 p. s. i., passing the resultant mixture into a settling zone wherein the mixture is separated by gravity into an upper oil layer and a lower water layer under settling conditions such that the oil layer contains less than about 0.3% by volume of water and the water layer contains not less than about 3% by volume of oil, and withdrawing the settled oil and water separately from said settling zone.

2. The method of claim 1 wherein said settling is carried out at a rate in the range of about 0.05–0.5 gallon/minute of said mixture per ft.$^2$ of settling surface area.

3. A method for removing essentially water-insoluble contaminants from hydrocarbon gas oils which comprises intimately mixing a hydrocarbon gas oil with water in a mixing zone in the proportions of about 1–2 parts of hydrocarbon gas oil per part of water by volume at a mixing intensity equivalent to a diffeerntial pressure of about 6–10 p. s. i., passing the resultant mixture through a settling zone at a throughput in the range of about 0.05–0.5 gallon/minute of said mixture per ft.$^2$ of settling surface area to settle out by gravity an upper oil layer and a lower water layer, and withdrawing the resultant settled oil and settled water separately from said settling zone.

4. The method according to claim 3 in which said settled oil from said settling zone is withdrawn and passed to a catalytic cracking zone wherein it is converted in the presence of a catalytic substance into lower boiling products.

5. A method for continuously removing essentially water-insoluble metal compounds from a contaminated hydrocarbon gas oil which comprises combining a contaminated hydrocarbon gas oil with water in the proportions of about 1–2 parts of hydrocarbon gas oil per part of water by volume, introducing the combined hydrocarbon gas oil and water into a mixing zone wherein the hydrocarbon gas oil and water are intimately mixed at a mixing intensity equivalent to a differential pressure of about 6–10 p. s. i., passing the resultant mixture through a settling zone at a throughput of less than about 0.5 gallon/minute of said mixture per ft.$^2$ of settling surface area so as to settle out by gravity an upper oil layer and a lower water layer which contains at least about 3% by volume of residual oil, withdrawing the settled hydrocarbon gas oil from said settling zone, separately withdrawing the settled water from said settling zone, passing at least a portion of said settled water into a separating zone wherein said residual oil is coalesced and is settled from said water by gravity to form a second upper oil layer and a second lower water layer, withdrawing the settled residual oil from said separating zone and recycling it for admixture with said contaminated hydrocarbon gas oil, and discarding the settled water from said separating zone.

6. The method of claim 5 in which at least a portion of the water of said first lower water layer is recycled for combination with said contaminated gas oil.

7. The method according to claim 5 in which said settled oil from said settling zone is withdrawn and passed to a catalytic cracking zone wherein it is converted in the presence of a catalytic substance into lower boiling products.

References Cited in the file of this patent

UNITED STATES PATENTS

| 1,984,903 | Wagner | Dec. 18, 1934 |

FOREIGN PATENTS

| 511,368 | Belgium | May 31, 1952 |